United States Patent [19]
Daniel et al.

[11] 3,908,385
[45] Sept. 30, 1975

[54] PLANTED SURFACE CONDITIONING SYSTEM

[75] Inventors: William H. Daniel; Melvin J. Robey, both of West Lafayette, Ind.

[73] Assignee: Purdue Research Foundation, Lafayette, Ind.

[22] Filed: Jan. 23, 1974

[21] Appl. No.: 435,691

Related U.S. Application Data

[63] Continuation-in-part of Ser. No. 263,434, June 16, 1972, abandoned.

[52] U.S. Cl.......................................... 61/11; 61/13
[51] Int. Cl.².................... E02B 11/00; E02B 13/00
[58] Field of Search ...................... 61/10, 11, 12, 13

[56] References Cited
UNITED STATES PATENTS

| | | | |
|---|---|---|---|
| 1,083,148 | 12/1913 | Sparks | 61/10 |
| 2,578,981 | 12/1951 | Parker | 61/12 |
| 2,768,028 | 10/1956 | Robinson | 61/13 X |
| 2,786,418 | 3/1957 | Peck | 61/12 |
| 3,024,372 | 3/1962 | Seele | 61/13 X |
| 3,461,675 | 8/1969 | Izatt | 61/11 |

FOREIGN PATENTS OR APPLICATIONS

| | | | |
|---|---|---|---|
| 1,910,641 | 9/1970 | Germany | 61/11 |
| 482,615 | 7/1953 | Italy | 61/11 |

*Primary Examiner*—Paul R. Gilliam
*Assistant Examiner*—Alexander Grosz

[57] ABSTRACT

A system for rapidly stripping away excess moisture from a planted surface, such as an athletic field; including a subsurface multistrata base and drainage pipe combination adapted for vacuum pumping, said system also being reversible for subsurface irrigation and also including electrical circuitry for automatically controlling irrigation and/or draining away excess moisture.

2 Claims, 7 Drawing Figures

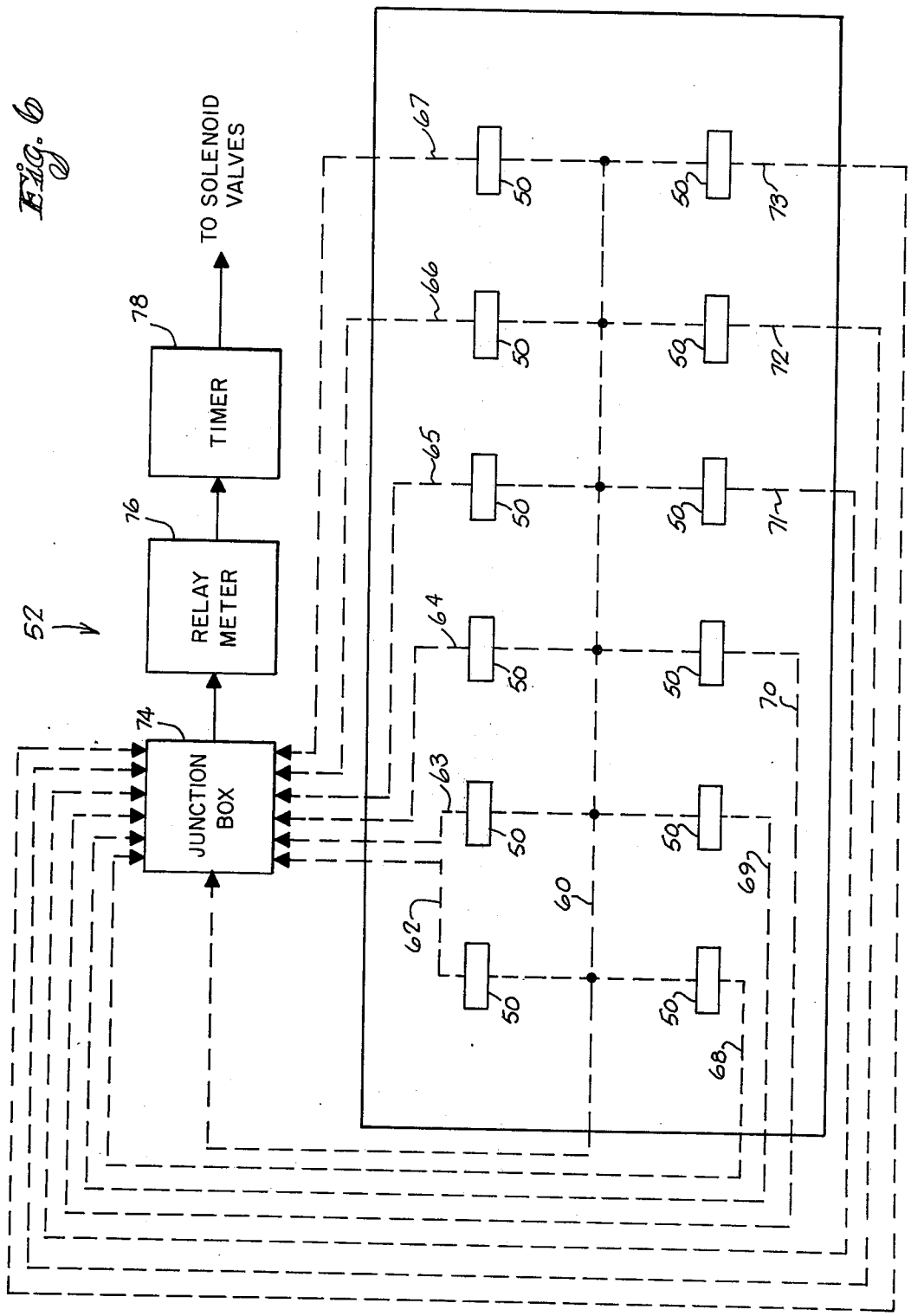

3,908,385

PLANTED SURFACE CONDITIONING SYSTEM

RELATED APPLICATIONS

This application is a continuation-in-part of U.S. Patent application Ser. No. 263,434, filed June 16, 1972 by William H. Daniel, entitled "Combination Turf, Drainage and Irrigation System", and now abandoned.

FIELD OF THE INVENTION

This invention relates to planted surface conditioning systems and more particularly relates to a system for controlling drainage and/or irrigation therefor.

BACKGROUND OF THE INVENTION

Outdoor athletic fields have principally been built by grading the soil at the proposed site, tiling the area, planting seed or sodding the playing area, and letting nature take its course. Sometimes better grades of topsoil than those available at the site have been hauled in but the drainage characteristics are seldom much improved. Such fields are customarily crowned at the center line as much as 24 inches to facilitate surface runoff.

Even the best of such fields, such as many of those used by the National Football League, many major colleges, and almost all high schools, become wet and muddy under rainy conditions as players and experienced sports fans will readily attest.

One solution to the problem has been the plastic artificial turf which is in use in the Astrodome and on many other professional and college athletic fields. This solution is costly and, while it eliminates muddy conditions and is not subject to destruction when wet (as is the average grass field), it still is very slippery under rainy conditions and may cause player injuries.

Very recently, court action has been instituted by certain professional football players in which they raise safety questions about the new artificial turf as opposed to natural grass athletic fields.

SUMMARY OF THE INVENTION

One object of this invention is to provide a natural grass athletic field which can be quickly drained to avoid wet and muddy playing conditions.

Another object of this invention is to provide a quickly drainable natural grass athletic field with substrata that can be controlled, such that the effect of compaction is minimized, and thereby retain injury preventing resiliency.

A further object is to build such a system so that it may also be used for subsurface irrigation.

Still another object of this invention is to provide a system that includes electrical circuitry whereby irrigation and/or drainage may be automatically carried out as needed.

These objects are accomplished by constructing the turf substrata of substantially soil free materials which are installed as a compacted porous rootzone and which are not affected by further compaction all in combination with a vacuum pump connected subsurface drainage system.

The system is built on a substantially level site on a firm subsoil, then trenches are cut for the subsurface drainage pipes and the vacuum pump pit, or pits. Then the entire turf area is underlaid with a waterproof layer, such as a plastic sheet. The drains are installed above this sheet and then sand is filled up to the playing field surface then a non-compactible mixture of, for example, vermiculite, calcined aggregate and peat, is added to form a rooting medium for sod.

This highly permeable substrata then permits rainfall to be promptly stripped away from the grass playing surface when the vacuum pump connected to the subsurface drain is activated. The plastic sheet traps the water and permits it to be drawn off by the drainage system and, when it is wished to reverse the system for irrigation purposes, it prevents water from being wasted by seepage deeper into the soil.

By providing moisture sensors in the area to be monitored for moisture content, automatic irrigation and/or drainage may be accomplished by electrical circuitry connected with the moisture sensors and controlling the addition of water to or drainage of water from the monitored area as needed to maintain the moisture content within a predetermined range.

BRIEF DESCRIPTION OF THE DRAWINGS

FIG. 6 is a top view of an athletic field such as shown in FIG. 1 but illustrating in broken lines a plurality of moisture sensors implanted therein, the electrical connections therefrom also being indicated in broken lines leading to a common junction box.

DESCRIPTION OF THE PREFERRED EMBODIMENTS

Figure 1:
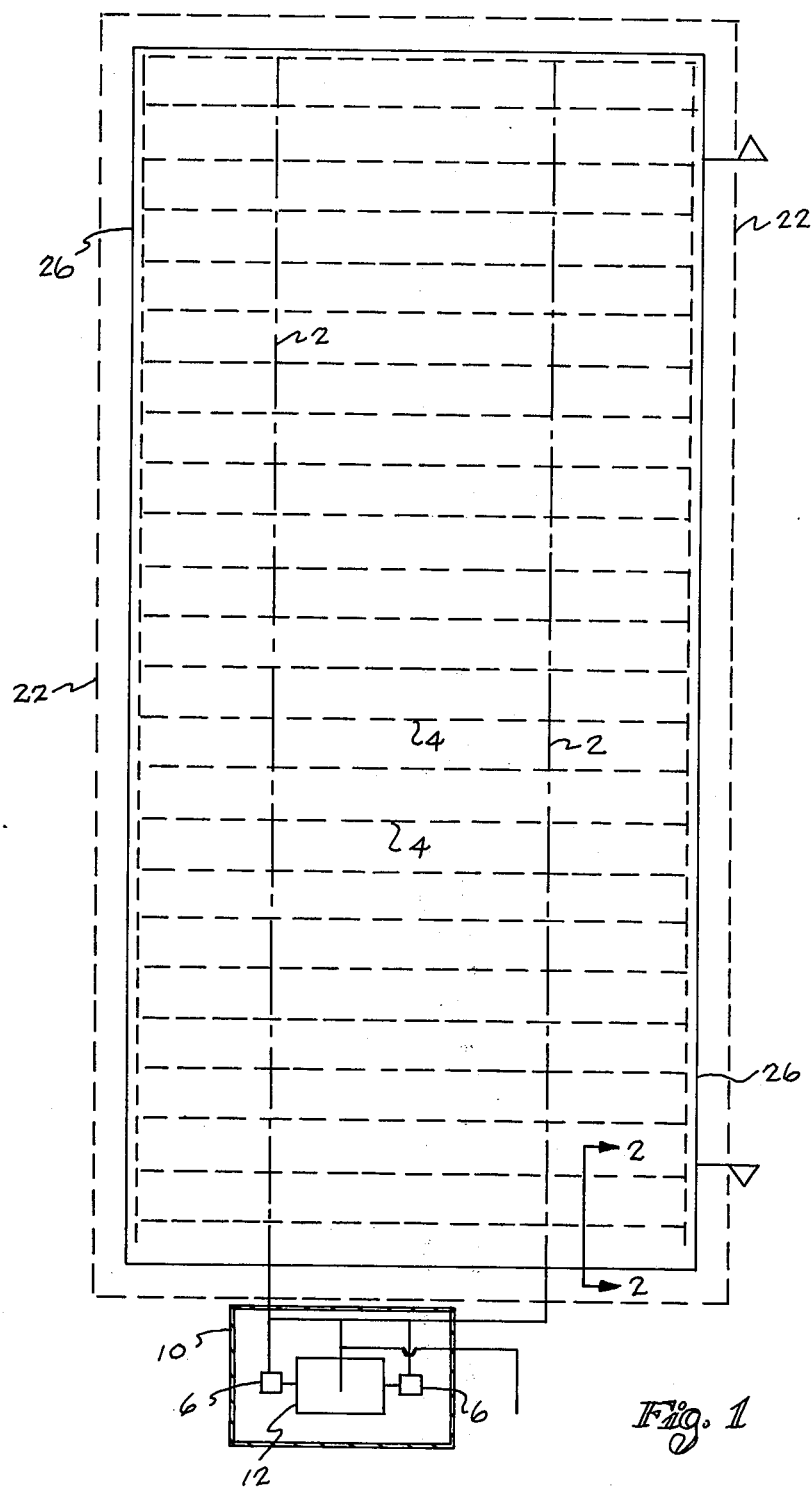
FIG. 1 is a top view of an athletic field with the subsurface drainage pipes indicated in broken lines and schematically indicating the connection of such drainage system to the vacuum pump pit.

Referring to FIG. 1, a typical layout for a football size athletic field is shown, wherein main collector drains 2 are interconnected with drain laterals 4, which are of porous material such as slitted type drains.

The collector mains are connected to vacuum pumps 6, which pump discharges are connected to outlet drain 8 located at the bottom of a pump pit 10 below a grate 12.

Figure 2:
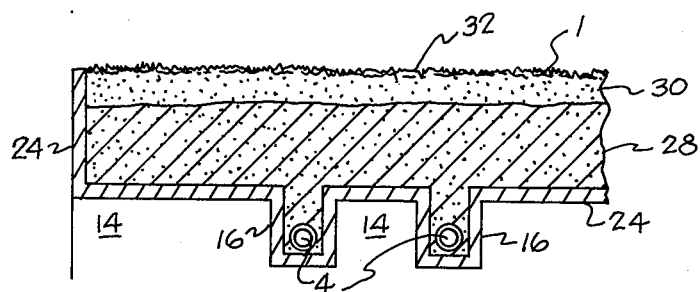
FIG. 2 is a cross-section taken along lines 2—2 shown in FIG. 1.
Figure 5:
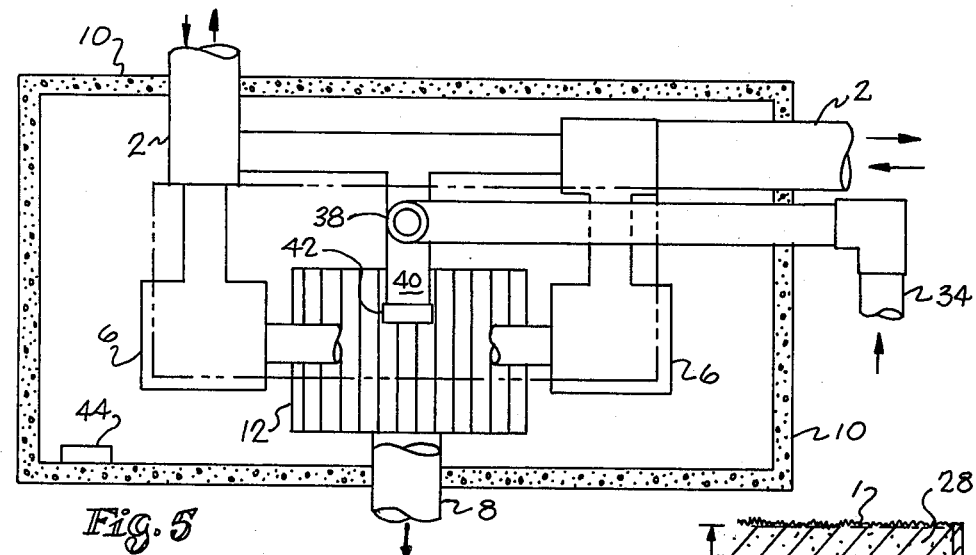
FIG. 5 is a diagrammatic top view of the pump pit.
Figure 4:
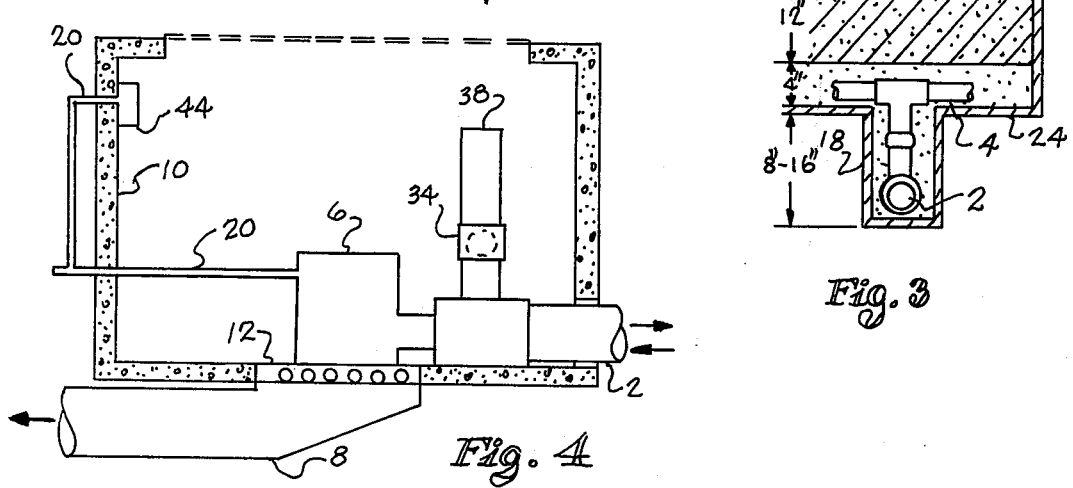
FIG. 4 is a diagrammatic side view of the pump pit.
Figure 3:
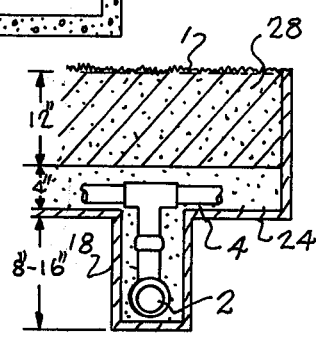
FIG. 3 is a diagrammatic showing of the connection of one of the small closely spaced laterals to one of the main drains with approximate relative depths being indicated in inches.

The field surface is prepared for installation of this system by first preparing a level surface and then excavating to about 12 inches below final grade to the subsoil base, said subsoil base being generally indicated in FIG. 2 at 14. Then lateral trenches 16 are dug at desired spacings and main trenches 18 (shown in FIG. 3) are also dug. Typically, the lateral trenches are 4 inches deep and the main trenches are sloping, 8 to 16 inches deep. The pump pit 10 and underground electrical conduit power supply 20 should also be installed at this preparatory stage of construction.

Independent perimeter drains 22 should be installed to keep all other surface runoff away from the playing surface to be drained.

Then a waterproof barrier 24, such as 10 mil plastic, is installed over the compacted subsoil and in the trenches beneath the main and lateral drains and is also carried up to the surface at the field perimeter 26.

The sheets of plastic should be overlapped and sealed to form a continuous watertight barrier.

A uniform porous media 28 is then filled into the depth (typically about 12 inches) between the compacted subsoil 14 and the final grade level 1. This porous media 28 is preferably comprised of sand between 0.125 and 0.5 mm grain size, with finer sands needing deeper depths.

Then a rooting medium 30 for the turf to be grown comprised of substantially non-compactible materials composed of a mixture of peat, vermiculite and calcined aggregate is mixed into the top inch or two of said sand. It has been found that satisfactory proportions for said mixtures are obtained by applying the following rates of said components: two cubic yards of peat per 1000 square feet, 1 pound per square foot of calcinated aggregates, and 50 pounds per 1000 square feet of vermiculite (medium No. 3); and granular fertilizer may also be incorporated at this stage, using a slow releasing type having a composition such as 24-4-12. This mixture 30 will be mixed into the top inch of the sand, and then the field surface is compacted and smoothed to final grade 1. Little or no soil is needed or desired as most soils are subject to significant compaction which impedes drainage. Turf 32 is then planted on top of said final grade surface 1.

A vacuum suction pressure of about 4–6 inches Hg will rapidly strip rainfall down through the turf and porous sandy underlayment so that muddy playing conditions are prevented even during a football game under moderate rainfall conditions.

This system will ideally continuously drain away approximately 1 inch of rainfall per hour from the surface being drained. Of course, local conditions, drain sizes, pump choice and various other obvious factors, may increase or decrease the quantity of rainfall that is drained off on a basically zero time basis.

Another advantage of this system is that an irrigation inlet 34 may be combined with it to supply subsurface irrigation to the turf in periods of inadequate rainfall. Above ground sprinklers may be used as supplemental watering sources as an adjunct to this system. An overflow pipe 38 permits conservation of water during dry periods, the level of water retained above the plastic barrier being adjusted by the top of the overflow pipe 38. A drainage pipe 40 equipped with a stopcock or valve 42 permits gravity drainage when pumps 6 are not in operation. The pumps are actuated by a control switch 44 which may also include a water level sensing control, or a humidistat, calibrated for the desired automatic pump actuation.

Typical detailed specifications for this system are provided in the February 1972 issue of *Grounds Maintenance*, Copyright 1972, Intertec Publishing Corp., Kansas City, Mo. 64105.

Figure 7:
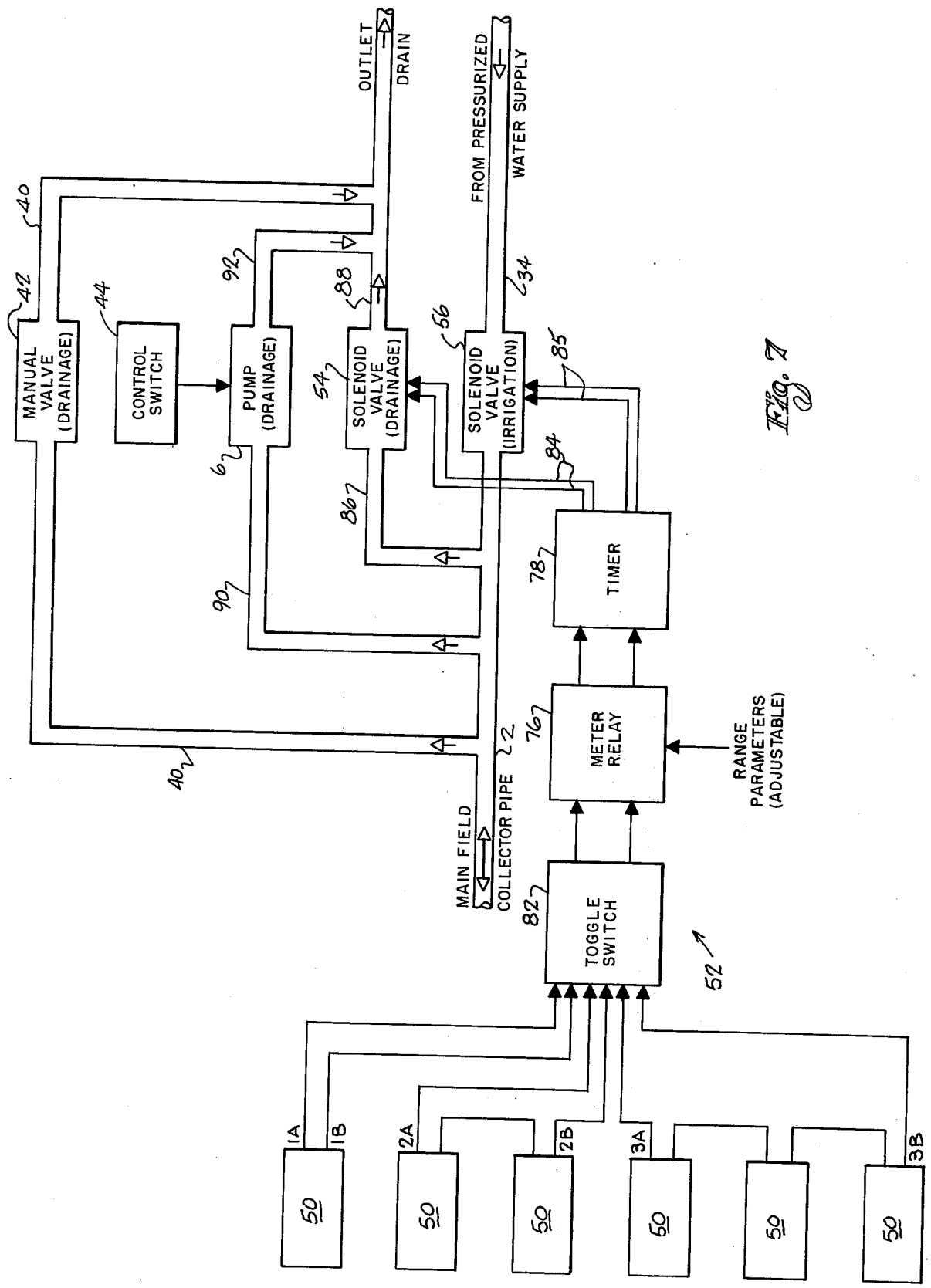
FIG. 7 is a partial block and fluid flow diagram illustrating electrical circuitry utilized to control and monitor moisture content of a playing field.

Electrical circuitry for automatic operation both for irrigation and drainage is shown in FIGS. 6 and 7. As shown, such circuitry utilizes a plurality of moisture sensors 50 which are connected with electrical processing circuitry 52 to control solenoid values 54 and 56, the former of which is used for drainage purposes and the latter of which is used for irrigation purposes.

As shown in FIG. 6, the plurality of sensors 50 may be individually positioned at spaced intervals throughout an area prepared in accordance with this invention to monitor and control the moisture content within that area. Such sensors are preferably placed in the porous medium 28 preferably about 3 inches below the turf and preferably about 1 to 2 feet apart. A common electrical lead 60 is connected to each sensor 50, while second electrical lead 62–73 extend from each sensor to a junction box 74 which also receives common electrical lead 60.

Moisture sensors 50 may be conventional and, as is well known, such a sensor acts as a resistance variable load with the effective resistance varying in a known manner dependent upon the amount of moisture present. Such a sensor may be, for example, a CEL-WFD Soil Block manufactured by Beckman Instruments, Inc., Cedar Grove, N.J.

Junction box 74 may also be conventional and may be utilized to sense the moisture content at any particular location by connecting the sensor 50 at that location with the electrical processing circuitry 52.

A conventional meter relay 76 is connected with the selected sensor 50 through junction box 74. Meter relay 76 preferably has adjustable parameters for minimum and maximum acceptable moisture levels. Such a meter may, for example, be a Model 301-C or 461-C manufactured by LFE Corporation, Process Control Division, Waltham, Mass. Meter relay 76 provides an output signal indicating that the measured moisture level has fallen below a preset minimum level and also can provide an output signal indicating that the measured moisture level has risen above a preset maximum level. In each case, a timer 78 is activated to energize the solenoids 74 and 76 to supply water to the area or to drain the same depending upon solenoid energization. Timer 78, when activated, preferably energizes the solenoids for a specific amount of time, preferably about one to two hours when water is to be supplied to the area being moisture controlled.

As shown in FIG. 7, a plurality of six sensors 50 are connected to toggle switch 82. As shown, one sensor 50 is connected individually to toggle switch 82 through leads 1A and 1B, while two other sensors 50 are connected in parallel to toggle switch 82 through leads 2A and 2B, and three other sensors 50 are likewise connected in parallel to toggle switch 82 through leads 3A and 3B. By spacing the sensors, preferably about one to three feet apart, moisture sensing can be selected by toggle switch 82 between the groups of sensors (with the effective resistance being determined by whether the individual sensor or a group of sensors in parallel is selected).

The effective resistance selected is connected through the toggle switch to meter relay 76 which is utilized to activate timer 78 in the same manner as described hereinabove with respect to FIG. 6. As shown in FIG. 7, timer 78 is connected with solenoid valves 54 and 56 through electrical leads 84 and 85, respectively. Solenoid valve 54 is normally open and is connected in the drainage line and has a conduit 86 connected to main field collector pipe 2 with the outlet side of solenoid valve 54 being connected with outlet drain 8 by means of conduit 88. Solenoid 56 is normally closed and is connected in the irrigation line and has one side connected with conduit 34 leading to the pressurized water supply (not shown) with the other side of solenoid valve 56 being connected to main field collector pipe 2.

As also shown in FIG. 7, drainage pump 6, controlled by control switch 44 (connected with an electrical supply not shown) is connected to main field collector pipe 2 through conduit 90, with the outlet pipe 92 from the pump being connected to outlet drain 8. As also shown, a manual valve 42 in conduit 40 controls drainage from main field collector pipe 2 without pump assistance when valve 42 is open.

In operation, meter relay 76 indicates the moisture sensed by sensor or sensors 50 connected thereto. If the indication is below a preselected minimum value, normally closed solenoid valve 56 is opened (and solenoid valve 54 is closed) by energizing timer 78 after which water from the pressurized water supply (not shown) flows through main field collector pipe 2 to drain laterals 4 to thereby supply water to the area being moisture controlled. Water can be supplied for a specific time by timer 78 (preferably one to two hours) or solenoid valve 56 could be maintained open and solenoid valve 54 closed until the preselected maximum value of meter relay 76 is reached.

While solenoid valve 54 is normally open, a closed solenoid valve could be used and if so, if the indication is above a predetermined maximum value, then solenoid valve 54 would be opened by energizing timer 78 after which water would be permitted to flow from the area being moisture controlled through main field collector pipe 2 to outlet drain 8 through conduits 86 and 88. In addition, if desired, the water can be pumped from the area being moisture controlled by energizing pump 6 to drain water through conduits 90 and 92 to outlet drain 8. Also, by opening manual valve 42, constant drain without pumping may be effected through conduit 40 to outlet drain 8.

What is claimed is:

1. A drainage system for rapid drainage of the top surface of an athletic playing field and for water conservation, characterized by: a compacted subsoil base; a waterproof barrier disposed above said subsoil; a drainage pipe system disposed above said waterproof barrier; a porous medium composed substantially completely of sand having an effective grain size in the range from 0.125 mm to 0.5 mm surrounding said drainage pipe system and disposed thereabove to a proposed final field grade level; a rooting medium comprised of substantially non-compactible materials composed of a mixture of peat, vermiculite and calcined aggregate, incorporated into the uppermost 1 to 2 inch portion of said porous medium; a vegetative cover crop rooted in the mixture of said rooting medium and said porous medium; and a vacuum pump operatively connected to said drainage pipe system to create a suction pressure of at least four inches Hg to provide suction at said surface whereby water upon said vegetative cover crop is continuously drawn down from the top surface thereof through said porous medium and into said drainage system so that substantially said entire top surface above said porous medium is rapidly drained of water thereon.

2. The drainage system of claim 1 wherein said system includes: a water supply conduit and a drainage pipe conduit connectable with said drainage pipe system, said drainage pipe conduit being connected to said vacuum pump to create said suction at said vegetative crop to rapidly drain water therefrom through said porous medium to said drainage pipe conduit and said water supply conduit being connectable with a pressurized water supply to eject water under pressure into said porous medium so that said moisture is forced upwardly through said porous medium toward said vegetative crop; electrical circuit means including a plurality of spaced sensing means in said porous medium above said pipe system for sensing the moisture content of said medium between said pipe system and said vegetative crop and providing an output indication thereof; and valve means connected with said electrical circuit means and responsive to said output indication therefrom to permit adjustment of the moisture content of said porous medium, said adjustment including connecting one of said water supply and drainage pipe conduits with said pipe system to adjust said moisture content as needed.

* * * * *